(12) United States Patent
Schulte (10) Patent No.: US 8,340,791 B2
(45) Date of Patent: Dec. 25, 2012

(54) PROCESS DEVICE WITH SAMPLING SKEW

(75) Inventor: John P. Schulte, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 450 days.

(21) Appl. No.: 12/571,622

(22) Filed: Oct. 1, 2009

(65) Prior Publication Data

US 2011/0082568 A1   Apr. 7, 2011

(51) Int. Cl.
| | |
|---|---|
| G01R 23/10 | (2006.01) |
| G01R 23/00 | (2006.01) |
| G01R 25/00 | (2006.01) |
| G01R 35/00 | (2006.01) |
| G01R 19/00 | (2006.01) |
| G01R 23/12 | (2006.01) |
| G06F 17/40 | (2006.01) |
| H03F 1/26 | (2006.01) |
| G05B 11/01 | (2006.01) |
| G05B 21/02 | (2006.01) |

(52) U.S. Cl. ........... 700/71; 700/72; 700/73; 324/76.11; 324/76.52; 324/76.59; 702/79; 702/89; 702/187; 702/189

(58) Field of Classification Search ............... 324/76.11, 324/76.52, 76.59; 700/71, 72, 73; 73/861.42, 73/861.66; 702/79, 89, 187, 189
See application file for complete search history.

(56) References Cited

U.S. PATENT DOCUMENTS

| | | | |
|---|---|---|---|
| 3,701,280 A | 10/1972 | Stroman | 364/510 |
| 4,238,825 A | 12/1980 | Geery | 364/510 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 252/62 |
| 4,677,841 A | 7/1987 | Kennedy | 73/30 |

(Continued)

FOREIGN PATENT DOCUMENTS

DE    91 09 176.4    10/1991

(Continued)

OTHER PUBLICATIONS

Notification of Transmittal of the International Search Report and the Written Opinion of the International Searching Authority, or the Declaration for PCT/US2010/050814 filed Sep. 30, 2010 and date of mailing Dec. 27, 2010; 12 pages.

(Continued)

*Primary Examiner* — Ronald Hartman, Jr.
(74) *Attorney, Agent, or Firm* — Westman, Champlin & Kelly, P.A.

(57) ABSTRACT

An industrial process device for monitoring or controlling an industrial process includes a first input configured to receive a first plurality of samples related to a first process variable and a second input configured to receive a second plurality of samples related to a second process variable. Compensation circuitry is configured to compensate for a time difference between the first plurality of samples and the second plurality of samples and provide a compensated output related to at least one of the first and second process variables. The compensated output can comprise, or can be used to calculate a third process variable. The third process variable can be used to monitor or control the industrial process.

26 Claims, 9 Drawing Sheets

U.S. PATENT DOCUMENTS

| | | | |
|---|---|---|---|
| 4,761,752 A * | 8/1988 | Barnes | 708/422 |
| 4,825,704 A | 5/1989 | Aoshima et al. | 73/861.42 |
| 4,881,412 A | 11/1989 | Northedge | 73/861.04 |
| 4,958,938 A | 9/1990 | Schwartz et al. | 374/208 |
| 5,035,140 A | 7/1991 | Daniels et al. | 73/290 |
| 5,058,437 A | 10/1991 | Chaumont et al. | 73/861.21 |
| 5,227,782 A | 7/1993 | Nelson | 340/870.11 |
| 5,381,355 A | 1/1995 | Birangi et al. | 364/999.999 |
| 5,606,513 A | 2/1997 | Louwagie et al. | 364/510 |
| 5,870,695 A * | 2/1999 | Brown et al. | 702/138 |
| 6,230,570 B1 | 5/2001 | Clark et al. | 73/861.06 |
| 6,253,156 B1 * | 6/2001 | Bui-Tran et al. | 702/17 |
| 6,301,973 B1 * | 10/2001 | Smith | 73/861.357 |
| 6,360,614 B1 * | 3/2002 | Drahm et al. | 73/861.357 |
| 6,655,221 B1 * | 12/2003 | Aspelund et al. | 73/861.04 |
| 6,934,651 B2 * | 8/2005 | Smaragdis | 702/89 |
| 7,197,408 B2 * | 3/2007 | Ferreira et al. | 702/45 |
| 7,275,415 B2 * | 10/2007 | Rhodes et al. | 73/28.01 |
| 7,406,878 B2 * | 8/2008 | Rieder et al. | 73/861.355 |
| 7,424,326 B2 * | 9/2008 | Enders et al. | 700/1 |
| 2003/0051558 A1 * | 3/2003 | Melnikov et al. | 73/861.27 |
| 2003/0213282 A1 | 11/2003 | Brockhaus | 73/1.34 |
| 2004/0144182 A1 * | 7/2004 | Gysling et al. | 73/861.42 |
| 2006/0016246 A1 * | 1/2006 | Rhodes et al. | 73/28.01 |
| 2008/0156101 A1 * | 7/2008 | Henry | 73/584 |
| 2008/0162013 A1 * | 7/2008 | Grouffal et al. | 701/101 |
| 2009/0038405 A1 * | 2/2009 | Hocker | 73/861.01 |
| 2009/0229364 A1 * | 9/2009 | Gysling | 73/623 |
| 2010/0145636 A1 * | 6/2010 | Nyfors | 702/49 |
| 2010/0259362 A1 * | 10/2010 | Schumacher et al. | 340/10.1 |
| 2011/0016988 A1 * | 1/2011 | Tombs et al. | 73/861.356 |
| 2012/0116681 A1 * | 5/2012 | Fuller et al. | 702/12 |

FOREIGN PATENT DOCUMENTS

| | | |
|---|---|---|
| DE | 102005025354 | 5/2005 |
| EP | 0 063 685 A1 | 11/1982 |
| EP | 0 214 801 A | 3/1987 |
| EP | 0 223 300 A2 | 5/1987 |
| EP | 1229309 | 8/2002 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |

OTHER PUBLICATIONS

"Flow Measurement," Handbook of Fluid Dynamics, V. Streeter, Editor-in-chief published by McGraw-Hill Book Company, Inc. 1961, pp. 14-4 to 14-15.

"Precise Computerized In-Line Compressible Flow Metering," Flow—Its Measurement and Control in Science in Science and Industry, vol. 1, Part 2, Edited by R. Wendt, Jr., Published by American Institute of Physics et al, (undated) pp. 539-540.

"A Systems Approach," Dr. C. Ikoku, Natural Gas Engineering, PennWell Books, (undated) pp. 256-257.

"Methods for Volume Measurement Using Tank-Gauging Devices Can Be Error Prone," F. Berto, The Advantages of Hydrostatic Tank Gauging Systems, undated reprint from Oil & Gas Journal.

"Hydrostatic Tank Gauging—Technology Whose Time Has Come," J. Berto, Rosemount Measurement Division Product Feature, undated reprint INTECH.

"Pressure Sensors Gauge Tank Level and Fluid Density," Rosemount Measurement Division Product Feature, undated reprint from Prepared Foods (Copyright 1991 by Gorman Publishing Company).

"Low Cost Electronic Flow Measurement System," Tech Profile, May 1993, Gas Research Institute, Chicago, IL.

"Development of an Integrated EFM Device for Orifice Meter Custody Transfer Applications," S.D. Nieberle et al., American Gas Association Distribution/Transmission Conference & Exhibit, May 19, 1993.

Advertisement, AccuRate Model 3308 Integral Smart DP/P/T Transmitter, (undated) Bristol Babcock, Inc., Waterown, CT 06795.

"Smart Transmitters Tear Up the Market," C. Polsonetti, Intech, Jul. 1993, pp. 42-45.

"Single Chip Senses Pressure and Temperature," Machine Design, 64 (1992) May 21, No. 10.

Brochure: "Reduce Unaccounted-For Natural Gas with High-Accuracy Pressure Transmitters," Rosemount Inc. Measurement Division, Eden Prairie, Minnesota, ADS 3073, May 1991, pp. 1-4.

Technical Information Bulletin, "Liquid Level Transmitter Model DB40RL Sanitary Sensor deltapilot," Endress + Hauser, Greenwood, Indiana, Sep. 1992, pp. 1-8.

"The Digitisation of Field Instruments" W. Van Der Bijl, Journal A, vol. 32, No. 3, 1991, pp. 62-65.

Specification Summary, "Teletrans.TM.3508-30A Smart Differential Pressure Transmitter," (undated) Bristol Babcock, Inc., Watertown, CT, 06795.

Specification Summary, "Teletrans.TM.3508-10A Smart Pressure Transmitter," (undated) Bristol Babcock, Inc., Watertown, CT, 06795.

Specification Summary, "AccuRate Advanced Gas Flow Computer, Model GFC 3308," (undated) Bristol Babcock, Inc., Watertown, CT, 06795.

Product Data Sheet PDS 4640, "Model 3201 Hydrostatic Interface Unit," Mar. 1992, Rosemount Inc., Eden Prairie, MN 55344.

Product Data Sheet PDS 4638, "Model 3001CL Flush-Mount Hydrostatic Pressure Transmitter," Jul. 1992, Rosemount Inc., Eden Prairie, MN 55344.

Advertisement, Model 3508 Transmitter, Control Engineering, Dec. 1992, Bristol Babcock, Inc., Watertown, CT 06795.

First Chinese Office Action for Chinese Application No. 201080014269.5, dated Jun. 7, 2012, 7 pages.

Communication pursuant to Rule 161(1) and 162 EPC for European Patent Application No. 10 763 559.1, dated May 8, 2012, 2 pages.

* cited by examiner

PROCESS DEVICE WITH SAMPLING SKEW

BACKGROUND OF THE INVENTION

The present invention relates to industrial process control and monitoring systems. More specifically the present invention relates to field devices in which at least two process variables are sampled for use in monitoring or controlling an industrial process.

Industrial processes are used in the manufacture and refinement of various goods and commodities such as oil, food stuff, pharmaceuticals, paper pulp, etc. In such systems, typically a process variable of a process fluid is measured by a field device. Examples of process variables include pressure, temperature, differential pressure, level, flow rate and others. Based upon this measured process variable, if the industrial process is controlled using a feedback system, the process variable can be used to adjust or otherwise control operation of the industrial process.

Some types of process variables are measured or calculated based upon measurement of two, or more, other process variables. For example, a differential pressure can be measured by measuring two separate process fluid pressures and subtracting the two measurements. The differential pressure can be used in determining flow rate or level of process fluid in a container.

However, when using two separate process variables to determine a third process variable, errors due to time skew error can be introduced into the determination.

SUMMARY

An industrial process device for monitoring or controlling an industrial process includes a first input configured to receive a first plurality of samples related to a first process variable and a second input configured to receive a second plurality of samples related to a second process variable. Compensation circuitry is configured to compensate for a time difference between the first plurality of samples and the second plurality of samples and provide a compensated output related to at least one of the first and second process variables.

DETAILED DESCRIPTION

As discussed in the Background section, in some instances the measurement of a process variable requires the measurement of two or more different process variables. One common example is the measurement of a differential pressure which can, in some instances, be based upon the measurement of two separate pressures, absolute or gauge, whose difference is then determined.

In some instances, this measurement may be accomplished electronically by sampling data from two separate process variable sensors. The sample data is then used to generate an output based upon a mathematical relationship between the two sampled signals. One example configuration is illustrated in U.S. Pat. No. 5,870,695, entitled DIFFERENTIAL PRESSURE MEASUREMENT ARRANGEMENT UTILIZING REMOTE SENSOR UNITS, issued Feb. 9, 1999 to Gregory C. Brown and David A. Broden.

Figure 1:
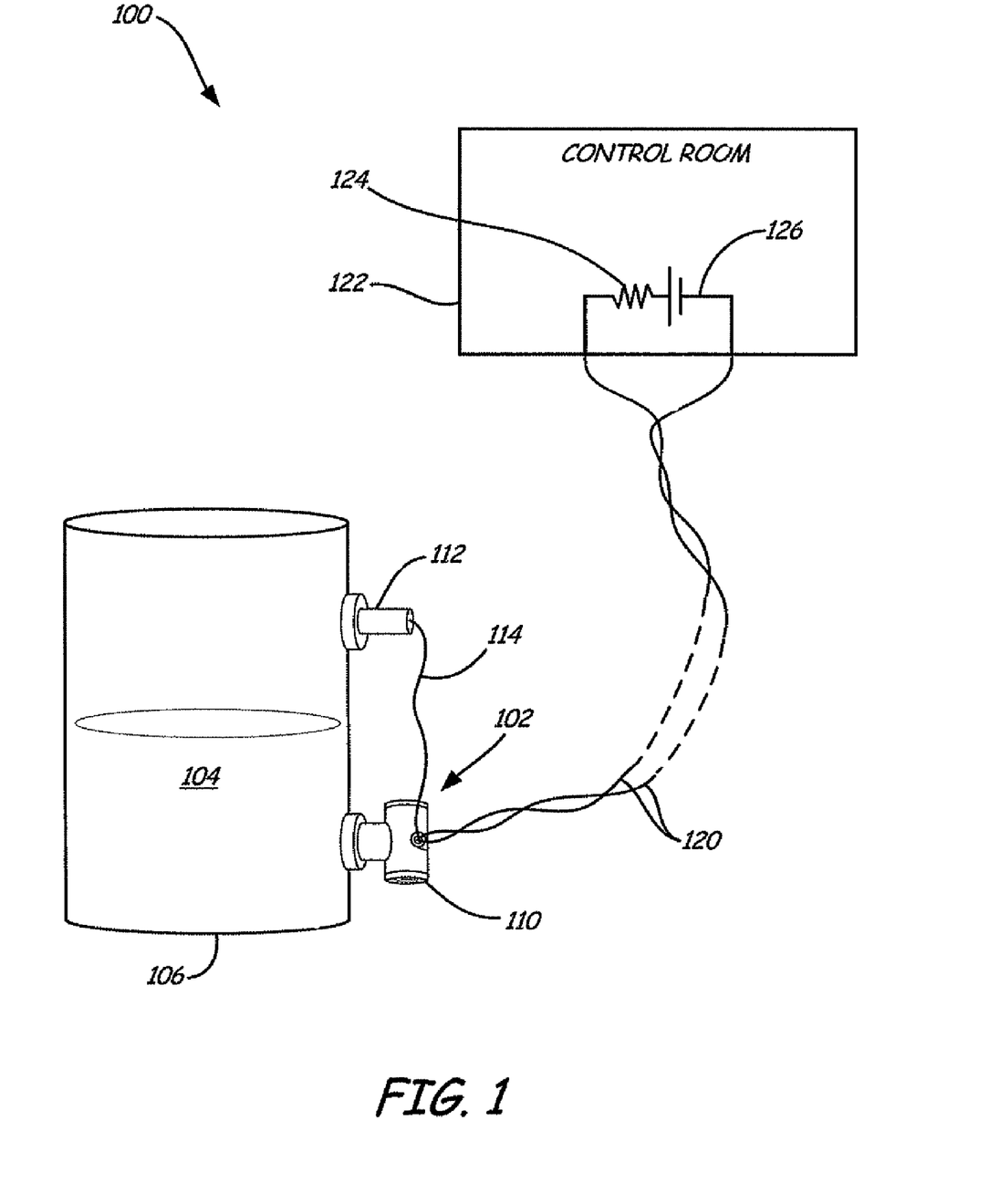
FIG. 1 is a simplified block diagram showing industrial process control system in which two separate process variables are sensed.

FIG. 1 shows an industrial process controller monitoring system 100 in which a process variable transmitter 102 is shown as being configured to measure the level of a process fluid 104 within a vessel 106 such as a tank. Transmitter 102 includes a main housing 110 and a remote sensor 112. Using known techniques, the main housing 110 can be configured to measure a pressure within the vessel 106 and receive an electronic signal over connection 114 from remote sensor 112 which is representative of a second pressure within the vessel. These two pressures can be used to determine the level of the process fluid 104 within the vessel 106. Information related to this measurement can be transmitted to a remote location such as a process control room 122 over a process control loop 120. In FIG. 1, the process control loop 120 is illustrated as a two wire process control loop which couples to a process control room 122 or other location while the process field device 102 can be located at a remote location. In such a configuration, process control loop 120 can carry information, such as data transmitted from field device 102, as well as be used as the sole source of power for the field device 102 using power from control room 122, illustrated as battery 126 which is series in a loop resistance 124. However, any appropriate process control loop can be used including wireless process control loops in which data is transmitted using, for example, RF signaling techniques.

Although the field device 102 is illustrated as having two main components, main body 110 and remote sensor 112, other configurations can also be used. For example two remote sensors, such as remote sensor 112 can couple to the main body. In another example configuration, more than two process variables are received from remote sensors.

Figure 2:
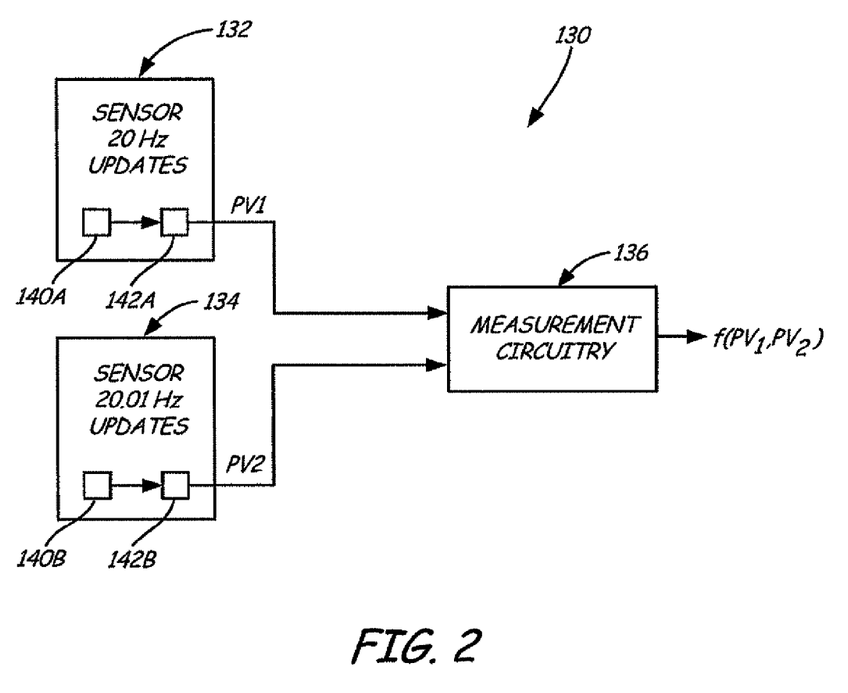
FIG. 2 is a simplified block diagram showing a more detailed view of a field device of FIG. 1.

FIG. 2 is a simplified block diagram showing a field device 130 including a first sensor 132 configured to sense a first process variable PV1 and a second sensor 134 configured to sense a second process variable sensor PV2. More specifically, process variable sensors 140A and 140B are provided in sensors 132 and 134, respectively, which are configured to sense a process variable. The sensed process variables are then sampled and digitized, using, for example, an analog to digital converter 142A in sensor 132 and 142B in sensor 134. The digitized process variables PV1 and PV2 are then provided to the measurement circuitry 136. The measurement circuitry 136 provides an output which is a function of the two process variables. For example, if a differential pressure is being measured, the output may be PV1-PV2.

Typically in such a device, the sampling of the two process variables does not occur exactly in synchronization. The sampling may operate at two slightly different frequencies. In the example of FIG. 2, this is shown sensor 132 operating at a sampling rate of 20 Hz while the second sensor 134 operates at a sampling rate of 20.01 Hz. Although in an ideal configuration the two sensors would operate synchronously, in most practical applications that is not achieved.

Figure 3A:
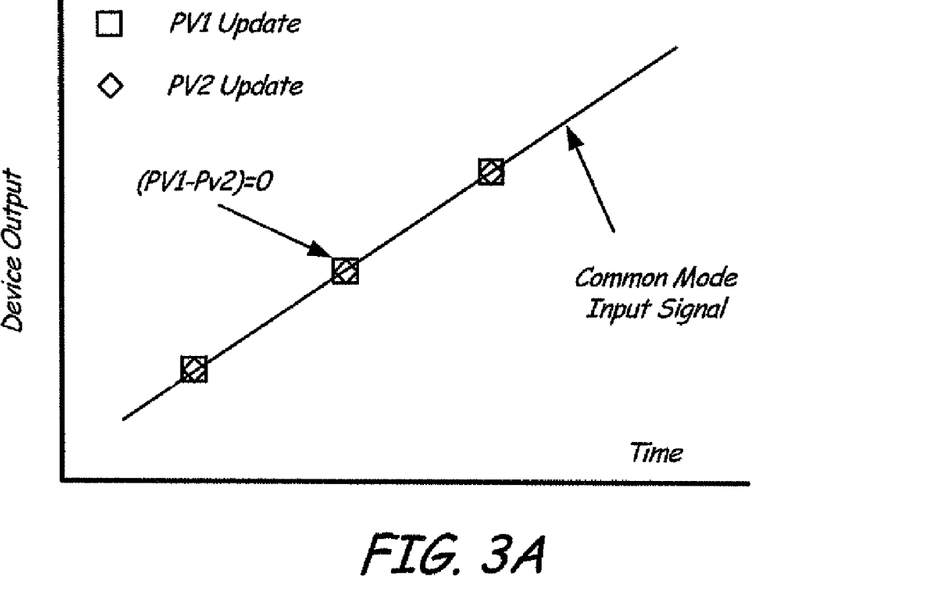
FIG. 3A and FIG. 3B are graphs of a common mode signal versus time and its effect on device output for a device which senses a process variable.
Figure 3B:
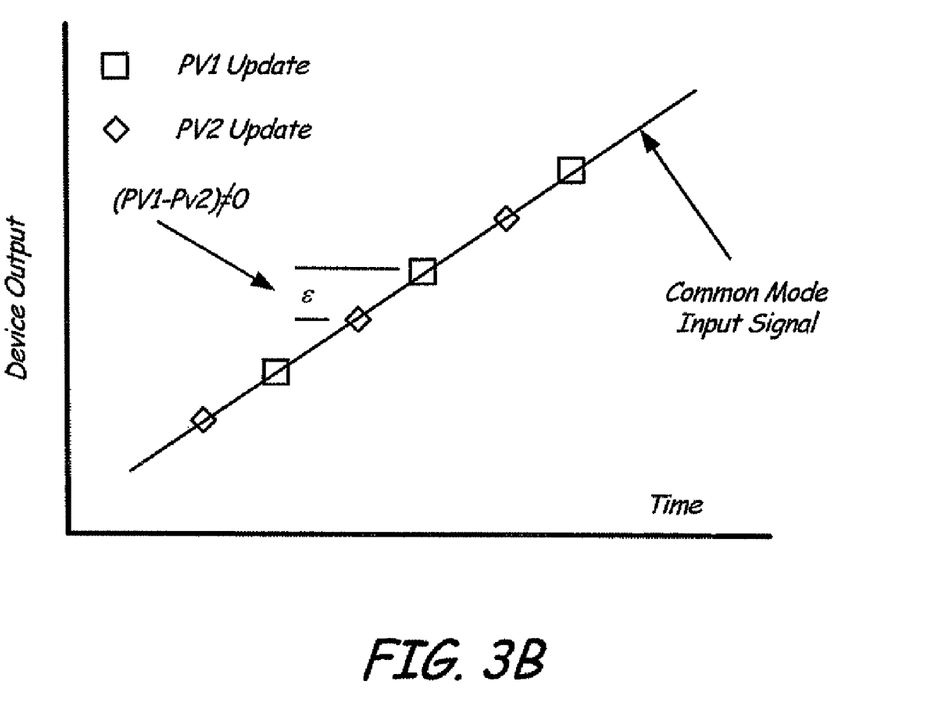

As the two sensors are not precisely synchronized, some types of common mode signals can introduce errors into the measurements. Static common mode signals that do not change appreciably from one update to the next are not a problem because the error introduced by the time skew between the two sampling rates is negligible. However, for dynamic common mode signals the error can become quite large. FIG. 3A is a graph showing a ramping common mode pressure signal in which the sampling of the process variables PV1 and PV2 are synchronized. In this example, the difference between PV1 and PV2 due to the common mode input signal is zero. However, FIG. 3B is a similar graph in which the updates of the sampled process variables are interleveled and do not occur at the same time. This causes the common mode input signal to introduce a difference between the two process variable measurements illustrated as $\epsilon$. The value of $\epsilon$ is a function of the rate of change of the common mode signal and the difference in time at which the two samples are taken. As a numerical example of this error, it can be shown that with a ramp rate of 10 psi per minute, the resulting error in a differential pressure measurement will be 0.22 inches of water if each device is updating at 20 samples per second. (Assuming a worst case skew error where 10 psi per minute=0.0083 psi per 50 mS=0.229 inches of water per update assuming updates are 50 mS). The time difference is 1 update period. This error will increase if the ramp rate is increased, or if the time between updates is increased.

Figure 4:
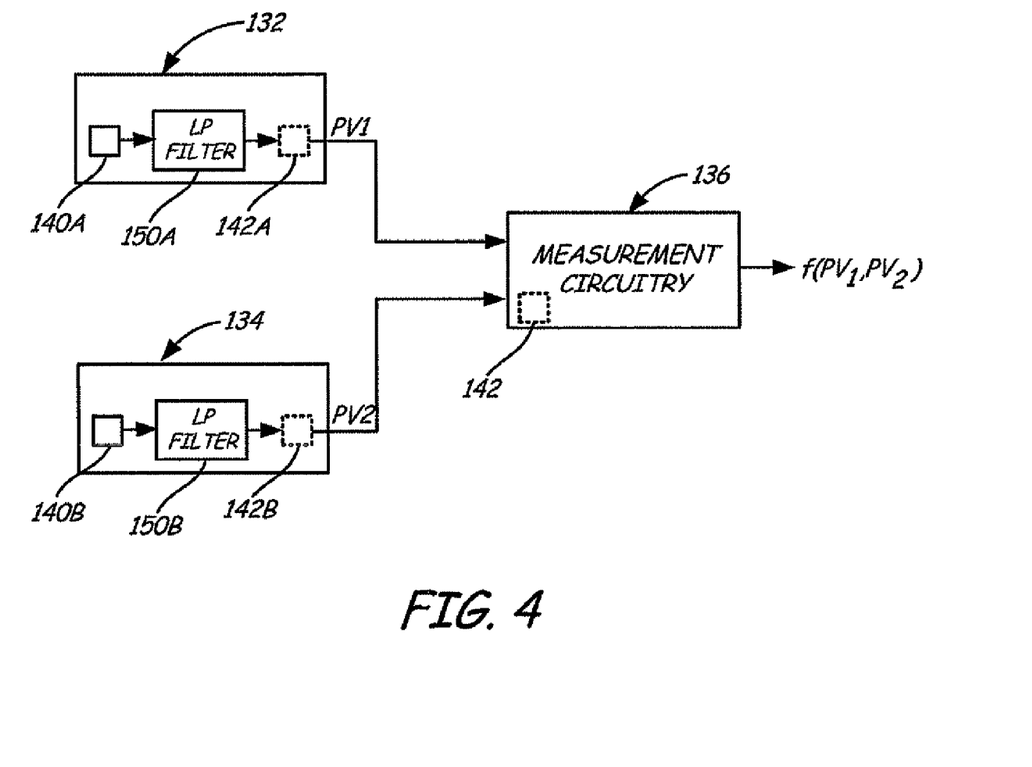
FIG. 4 is a block diagram similar to FIG. 2 in which low pass filters are introduced to provide compensation for time skew between two devices.

The present invention provides a compensation circuit or method which can be used to reduce the error due to the above described sampling skew. FIG. 4 is a simplified block diagram similar to FIG. 2 which shows one example implementation of such compensation circuitry. In the example of FIG. 4, compensation circuitry 150A and 150B are provided. In this example, the compensation circuitry comprises circuitry which increases the damping of the signal from the process variable sensors 140A and 140B. In this case, low pass filters are provided prior to sampling the process signal. Note that the analog to digital converter can be located in devices 132, 134 or in measurement circuitry 136 as element 142 and the damping function can be implemented before or after the analog to digital conversion. This method reduces time skew error because the low pass filters act to reduce the rate of change, or the ramp rate of the PV1 and PV2 signals.

In the configuration of FIG. 4, the filters in the two devices 132 and 134 should be matched (i.e., have an identical frequency response). If they are not matched, dynamic common mode signals will appear as normal mode signals to the measurement circuitry 136. For example, dynamic common mode signal would appear as a change in a differential pressure. One disadvantage of this method is that the overall response time of the system is degraded due to the increased damping.

Figure 5:
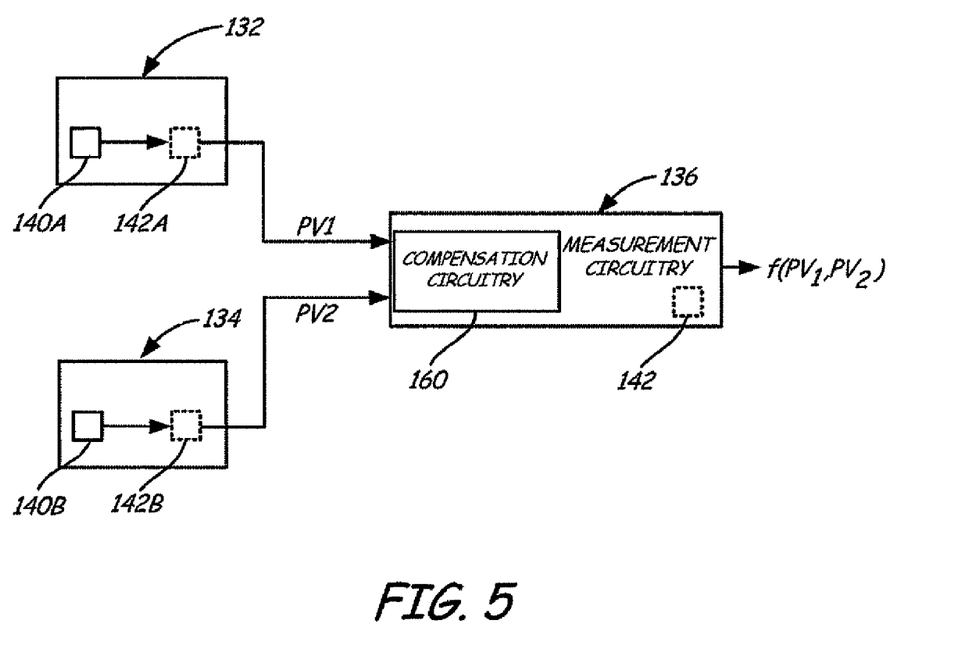
FIG. 5 is a simplified block diagram showing compensation circuitry illustrated within measurement circuitry.

FIG. 5 is a simplified block diagram showing a configuration in which, compensation circuitry 160 is implemented within the measurement circuitry 136. In such a configuration, various processing techniques can be used to compensate for the time differential between the samples of PV1 and PV2. Two examples are described below, however, the invention is not limited to these configurations. Similarly, the invention is not limited to the above described configuration in which the compensation circuitry 150A, 150B is implemented within the sensing devices 132 and 134 and comprises low pass filters.

Figure 6:
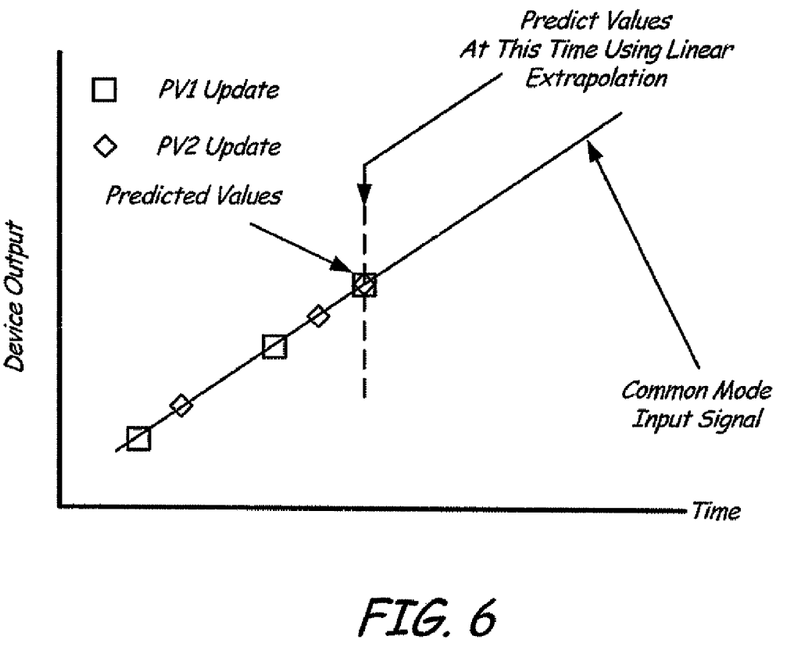
FIG. 6 is a graph showing a linear extrapolation technique for a ramping common mode signal.

In a first example configuration, compensation circuitry 160 is used to perform an extrapolation, such as a linear extrapolation, in order to compensate for a ramping common mode input signal. FIG. 6 is a graph showing the common mode output signal from devices 132 and 134 versus time. The update times for PV1 and PV2 are also illustrated. In such a configuration, a linear extrapolation is used to predict the values of one or both the process variables at a particular time. The predicted value is then used by the measurement circuitry 136 to provide an output as a function of the predicted values of PV1 and PV2. This method can be made to function properly if the common mode signal is continuously ramping upwards or downwards. However, if the common mode input signal varies non-linearly, and in particular if it changes direction, errors are introduced into the predicted values. (see FIG. 7).

Figure 7:
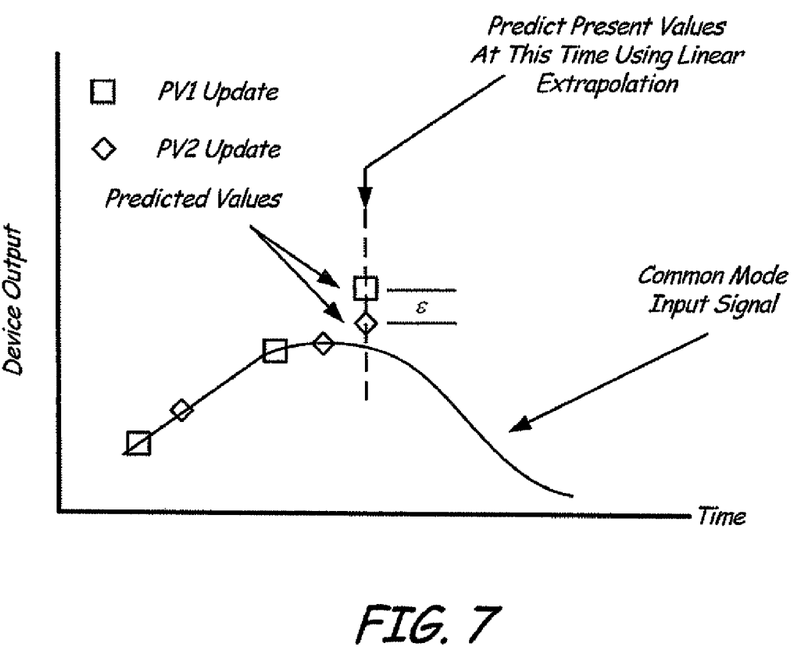
FIG. 7 is a graph showing non-linear extrapolation.

FIG. 7 is a graph showing the error for linear extrapolation method when the common mode signal is nonlinear. A second order polynomial can be fit to the last three sample updates to provide a better estimate for input signals including situations in which the common mode signal has some degree of curvature.

Figure 8:
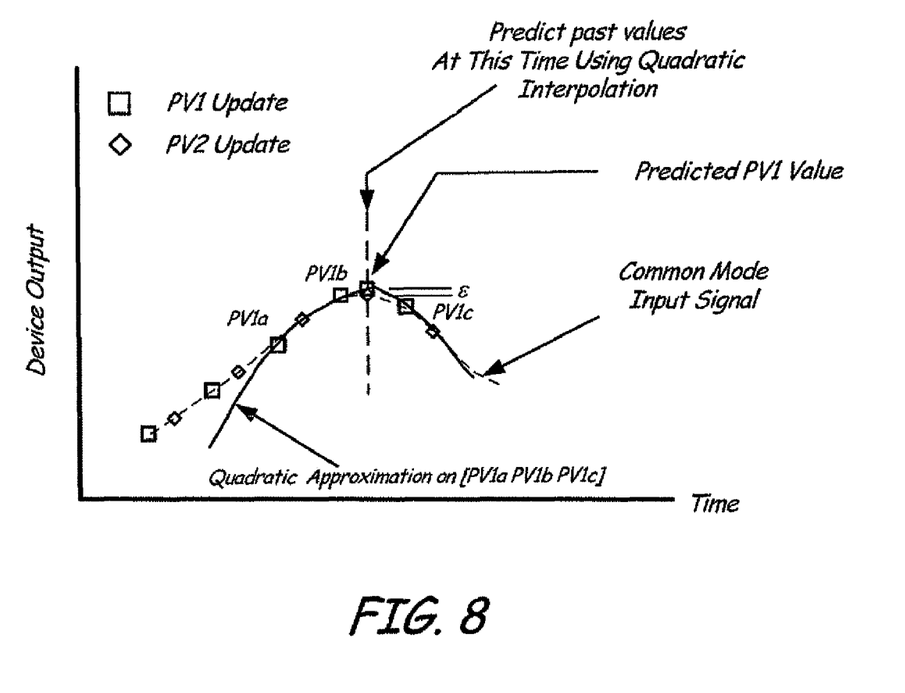
FIG. 8 is a graph showing a interpolation technique for using a quadratic polynomial.

FIG. 8 is a graph showing another method for addressing sample skew. In the example of FIG. 8, an interpolation technique is used to predict a value of both process variables at a past time. FIG. 8 shows a nonlinear common mode signal (dashed line). In such a configuration, the simplest method is to use linear interpolation in which the two most recent updates are used to predict the device output at some point of time that is between these two updates. If two devices are involved, a time is selected such that each device history has one update that is at, or later than, the chosen time and one update that is prior to the chosen time.

A further improvement on this technique can be obtained by using a non-linear function such as a polynomial approximation, spline method or other interpolation technique such that multiple updates from the device history are used in order to arrive at a predicted value. Such a method can be very effective provided that the rate of change of the device output is slow relative to the system sample rate period. A compromise with this method is that additional "dead" time is added due to a delay that is required to ensure that there is sufficient device history to compute the approximation. In the graph of FIG. 8, an example of this method is illustrated using a quadratic polynomial to approximate the device output.

In FIG. 8, the time chosen to predict the output values is between PV1$b$ and PV1$c$. A predicted value of PV2 is not required because the time chosen exactly coincides with the time that the second to last value of PV2 is received. Thus, the exact value of PV2 can be implemented in this example. The value of PV1 at that time is then predicted by using a second order polynomial that passes through the PV three points PV1$a$, PV1$b$ and PV1$c$. This polynomial is illustrated as a bold line in FIG. 8. The approximate error in this example is illustrated by the symbol $\epsilon$ and is relatively small. In this example, the simple "dead" time has been increased by one update period. However, this will typically have less effect on the overall system response than by increasing the damping to, for example, one second as described in connection with the low pass filter illustrated in FIG. 4.

Figure 9A:
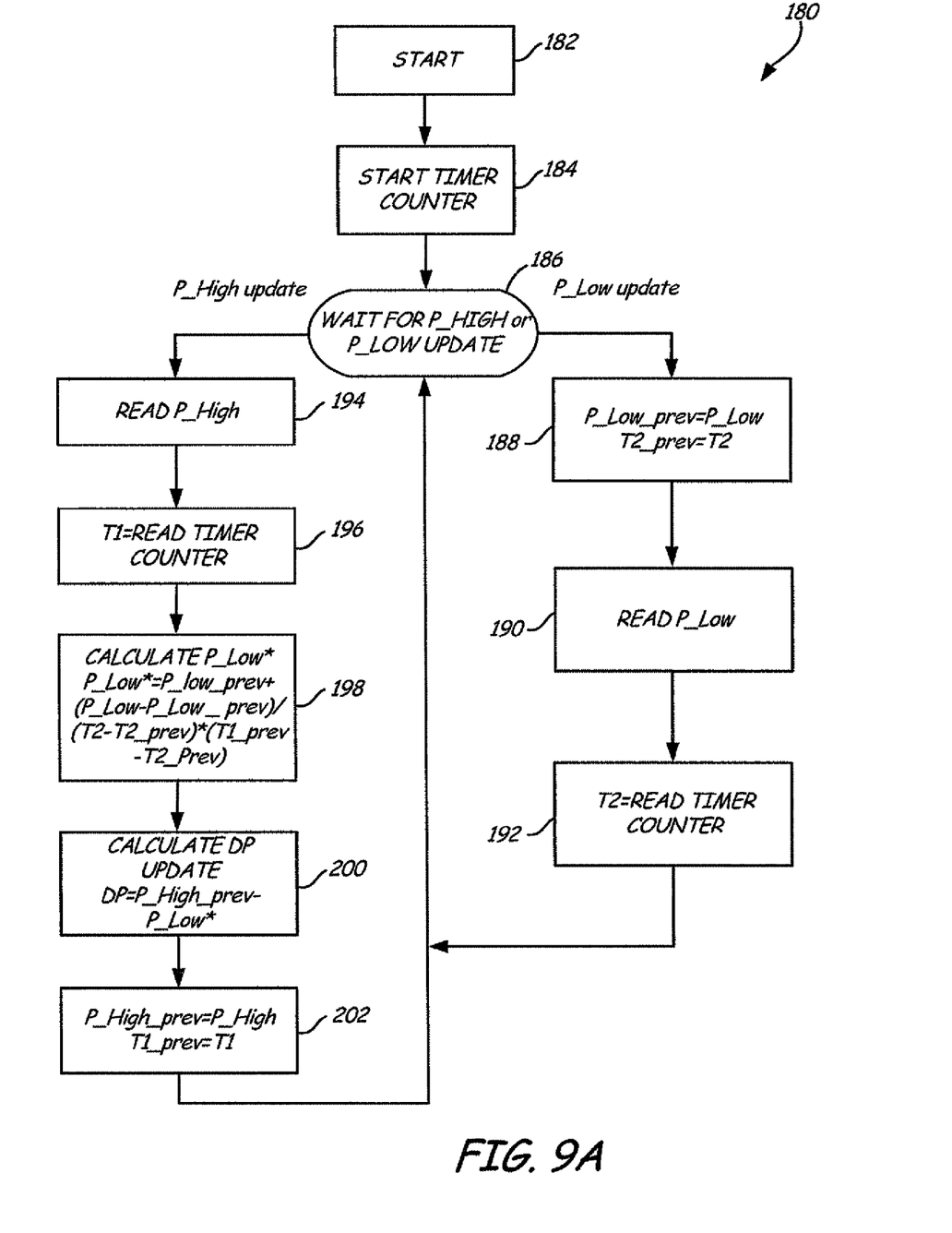
FIG. 9A is a simplified block diagram showing example steps in accordance with one configuration of the present invention and FIG. 9B is a graph of device output using time.
Figure 9B:
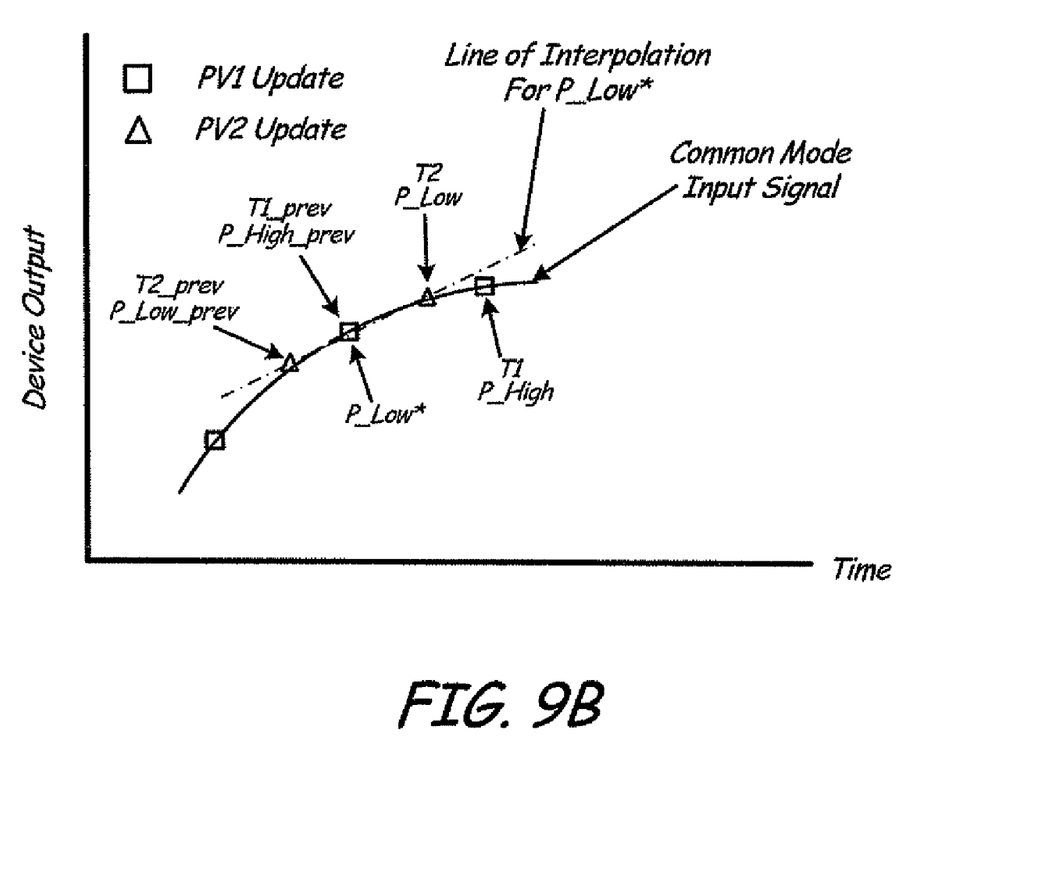

FIG. 9A is a simplified block diagram 180 showing example steps in accordance with one embodiment of the present invention and FIG. 9B is a graph of device output versus time. Block diagram 180 begins at start block 182 and at block 184 a timer counter is initiated. At block 186, the system 180 is waiting for an indication that an update is ready to be read from either P_high or P_low, P_high and P_low represent an update from a high pressure side pressure sensor and a low pressure side pressure sensor, respectively. When a low pressure update is ready, control is passed to block 188 and variable P_Low_prev is assigned the value of variable P_Low. Variable T2_prev is assigned the value of variable T2. At block 190, variable P_Low is read and at block 192 variable T2 is updated. Alternatively, if a high pressure update is ready at block 186, control is passed to block 194 where variable P_High is read, and at block 196 variable T1 is updated. At block 198 the value of P_Low at time T1_prev is predicted and assigned to variable P_Low*. The prediction is based on linear interpolation using variables (T2, P_Low), (T2_prev, P_Low_prev), and T1_prev. An interpolated value based upon the current P_Low and the previously read low pressure P_Low_prev values is calculated using a straight line linear interpolated technique. Based upon the interpolated value of the low pressure, a differential pressure is calculated at block 200, and provided to the control room 122 in FIG. 1. At block 202, variable P_High_prev is assigned the value of P_High and variable T1_prev is assigned the value of variable T1. The steps shown in FIG. 9 can be implemented in, for example, a microprocessor of measurement circuitry 136. Thus, in such configuration, the microprocessor functions as the compensation circuitry 160.

In the above discussion, the term "interpolation" is used. However, there is an exception to this case in which extrapolation is used to arrive at a predicted value of P_low at block 198. More specifically, in a typical situation the two process variables are updated at an approximately the same rate and are interlooped in such a manner that the time gap between the two process variables is very discernible. However, in some instances, the time difference between the two process variables may become very small. In this case, the updates are nearly synchronized and it may be possible to receive two consecutive updates from P_low, and then two consecutive updates from P_high. This will alter the interleaving pattern and extrapolation will be required rather than an interpolation to arrive at a predicted value of P_low.

In the above description, the examples are provided for only two process variables. However, any number of process variables may be implemented. The compensation circuitry can be implemented in the device in which the process variable is sensed, in a secondary device, for example, a device in which the process variable is received, or at some other location. With these techniques, the sampling skew error is reduced from two or more asynchronously updating devices using appropriate techniques including low pass filtering, linear or higher order extrapolation, or linear or higher order interpolation. These techniques may be well suited for systems using wireless communication in which the sampled process variables are asynchronous. Further, although the above discussion relates to developing a process variable based upon at least two other process variables, the present invention is also applicable to controlling a process, such as controlling a valve actuator or other process control device, based upon two process variables. In some configurations, the sampled process variables may be time stamped. In such a configuration, the techniques described herein can be used to reduce error due to the sampling time skew between the two devices. The sampling time skew in a wireless environment may become very uncontrolled due to the variable latency in a wireless radio system. For example, a mesh system self organizes to determine how the information routes back to a host. The information from PV1 may route directly to the host and thus have relatively low latency. The information from PV2 may hop through several nodes on the way to the host and thus have relatively high latency. In this matter the self organizing mesh network adds significant uncertainty to the sampling time skew.

Although the present invention has been described with reference to preferred embodiments, workers skilled in the art will recognize that changes may be made in form and detail without departing from the spirit and scope of the invention.

In the above discussion only one of the process variables is compensated. However, in some configurations, it may be desirable to compensate two or more process variables.

What is claimed is:

1. An industrial process apparatus for monitoring or controlling an industrial process, comprising:
a first process variable sensor configured to sense a first process variable and provide a first process variable sensor output;
a second process variable sensor configured to sense a second process variable and provide a second process variable sensor output;
a first analog to digital converter configured to sample the first process variable sensor output at a first sample rate and provide a first plurality of samples;
a second analog to digital converter configured to sample the second process variable sensor output at a second sample rate and provide a second plurality of samples, wherein the first and second sample rates are asynchronous;
a first input configured to receive the first plurality of samples related to the first process variable;
a second input configured to receive the second plurality of samples related to the second process variable; and
compensation circuitry configured to compensate for a time difference between the first plurality of samples and the second plurality of samples due to the first and second sampling rates being asynchronous and provide a compensated output related to both process variables.

2. The apparatus of claim 1 wherein the compensated output is based upon an extrapolation of the first plurality of samples related to the first process variable.

3. The apparatus of claim 2 wherein the compensation circuitry is further configured to provide a compensated output related to the second process variable.

4. The apparatus of claim 1 wherein the compensated output is based upon an interpolation of the first plurality of samples related to the first process variable.

5. The apparatus of claim 4 wherein the interpolation is based upon two adjacent samples of the first plurality of samples related to the first process variable.

6. The apparatus of claim 1 wherein the compensated output is based upon a curve fit between at least three samples in the first plurality of samples related to the first process variable.

7. The apparatus of claim 6 wherein the curve fit comprises a polynomial curve fit.

8. The apparatus of claim 1 wherein the first and second plurality of samples are time stamped.

9. The apparatus of claim 1 including measurement configured to calculate a third process variable as a function of a compensated first plurality of samples related to the first process variable and the second plurality of samples related to the second process variable.

10. The apparatus of claim 1 wherein the compensation circuitry provides damping to the first and second plurality samples.

11. The apparatus of claim 10 wherein the compensation circuitry comprises a low pass filter.

12. The apparatus of claim 1 wherein at least one of the first and second inputs comprises a wireless input.

13. The apparatus of claim 1 including measurement circuitry configured to calculate a differential pressure based upon a compensated value of the first process variable and the second process variable.

14. A method for use in an industrial process device for compensating for time difference between two process variables comprising:
   receiving a first plurality of samples related to a first process variable sampled at a first sample rate;
   receiving a second plurality of samples related to a second process variable sampled at a second sample rate, wherein the first and second sample rates are asynchronous and there is a time differential between the samples of the first and second process variables;
   compensating for the time difference between the first plurality of samples and the second plurality of samples due to the first and second sampling rates being asynchronous;
   providing an output related to a third process variable as a function of a compensated value of first process variable and the second process variable.

15. The method of claim 14 wherein the compensating is based upon an extrapolation of the first plurality of samples related to the first process variable.

16. The method of claim 14 wherein the compensating is based upon interpolating between at least two of the first plurality of samples related to the first process variable.

17. The method of claim 16 wherein the interpolating is based upon two adjacent samples of the first plurality of samples related to the first process variable.

18. The method of claim 14 wherein the compensating is based upon a curve fit between at least three samples in the first plurality of samples related to the first process variable.

19. The method of claim 18 wherein the curve fit comprises a polynomial curve fit.

20. The method of claim 14 wherein the first and second plurality of samples are time stamped.

21. The method of claim 14 including calculating a third process variable as a function of a compensated first plurality of samples related to the first process variable and the second plurality of samples related to the second process variable.

22. The method of claim 14 wherein the compensating comprises damping the first and second plurality of samples.

23. The method of claim 22 wherein the damping comprises a low pass filtering.

24. The method of claim 14 wherein at least one of the first and second plurality of samples is received from a wireless input.

25. The method of claim 14 including calculating a differential pressure based upon a compensated value of the first process variable and the second process variable.

26. The method of claim 14 including compensating the second process variable.

* * * * *